INVENTORS
RAYMOND PAUL LUEDDEKE
LOUIS LUEDDEKE
BY
Davis, Hoxie, Faithfull & Hapgood
ATTORNEYS INVENTORS
RAYMOND PAUL LUEDDEKE
LOUIS LUEDDEKE
BY
Davis, Hoxie, Faithfull & Hapgood
ATTORNEYS United States Patent Office 3,431,598
Patented Mar. 11, 1969

3,431,598
MACHINE ORGANIZATION FOR MANUFAC-
TURING TARGET DISCS
Raymond Paul Lueddeke and Louis Lueddeke, Scotch
Plains, N.J., assignors to Eastern Target Company, Inc.,
Scotch Plains, N.J., a corporation of New Jersey
Filed July 20, 1966, Ser. No. 566,614
U.S. Cl. 18—5                                    13 Claims
Int. Cl. B29c 5/04

ABSTRACT OF THE DISCLOSURE

A machine for manufacturing cast target discs employs a plurality of mating male and female die assemblies, positively retracted ejector rods cooperating with a star wheel to collect the formed discs, and improved fill and cooling apparatus to permit continuous fabrication of such discs at a relatively rapid rate.

---

Figure 1:
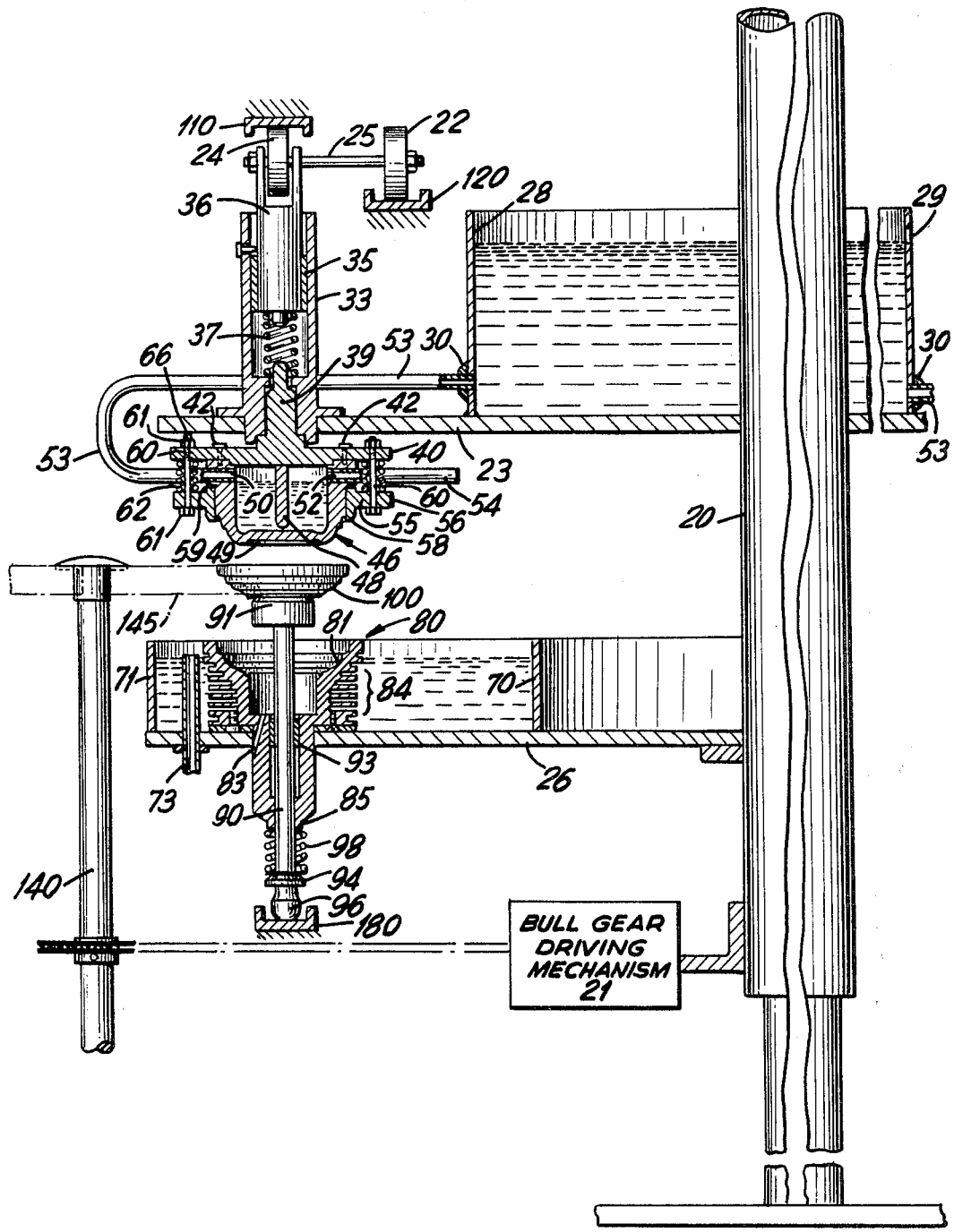

This invention relates to machine organizations and, more specifically, to an assembly for fabricating disc-like structures.

Cylindrical disc embodiments, e.g., target clay pigeons, or "birds" utilized for trap shooting, have been fabricated by setting hot flowing tar compositions, resins, or similar materials. However, existing machinery for effecting such production has not been found entirely satisfactory. First, cooling deficiencies characterizing prior art organizations have limited the batch processing rate thereof, often causing temporary machine shut downs until the requisite heat transfer can be effected. Then also, the fabrication rate has been limited by localized vacuums induced in such machines by heat expansion and piston-type physical mechanisms.

Moreover, prior art organizations have not provided for fully automatic operation, and hence require significant attendent operator time which adds appreciably to the cost of target manufacture.

It is therefore an object of the present invention to provide an improved machine organization for fabricating disc-like structures.

More specifically, an object of the present invention is the provision of a fully automatic machine assembly for producing target pigeons from a hot flowing settable composition.

Another object of the present invention is to provide a target manufacturing apparatus which operates at a relatively rapid cyclic rate not limited by cooling or vacuum dissipation requirements.

These and other objects of the present invention are realized in a specific illustrative machine organization for manufacturing annular disc structures suitable for use as trap or skeet shooting targets. The organization includes an array of immediately contiguous female die assemblies which have placed therein a continuous stream of molten tar material. The female die array is located on the periphery of a rotating housing and a doctor, or wiper blade having a forced stream of hot air associated therewith is offset from the tar fill point to deposit the tar material in the hollow of the female die members.

A male die array, having concentric stripper rings in one-to-one correspondence therewith, are forced against associated female dies by a cam biasing arrangement. The engaged dies are continuously subjected to a flowing water coolant such that the operand tar hardens between the male and female die faces to the proper form.

A sequence of cams are adjusted such that subsequent to the desired hardening, first the male die and then the associated stripper ring at each manufacturing position is disengaged from the mating female die and the newly formed target bird. An eject cam next causes a disc ejection cylinder and cylinder head located at the center of each female die to lift the end product target, whereupon the bird is swept onto a conveyor belt for further processing or packaging by a star wheel synchronized with the main machine drive.

To enhance the speed of operation, vacuum inhibiting apertures are included in the female dies and the stripper rings to respectively facilitate the vertical translation of the male dies and the ejection apparatus vis-a-vis the female dies.

It is thus a feature of the present invention that a machine for manufacturing target clay pigeons includes a plurality of contiguous female dies each having an eject cylinder and a vacuum inhibiting aperture therein, a plurality of male dies in one-to-one correspondence with the female dies, a plurality of stripper rings each including at least one pressure equalizing aperture therein and being concentrically mounted on a different male die, a plurality of cam organizations for selectively imparting vertical translation to the male dies and to the eject cylinders, and a star wheel synchronized with the rotation of the female dies for transporting the end product discs onto a conveyor belt for the eject cylinders.

Figure 2A:
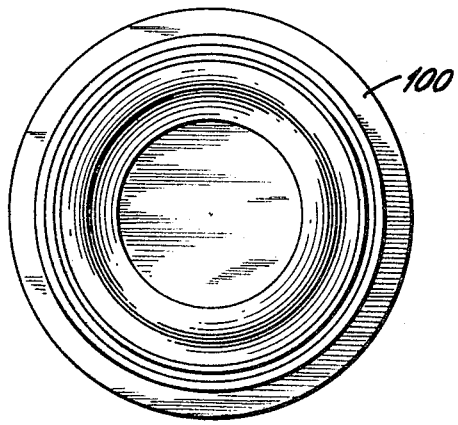
Figure 2B:
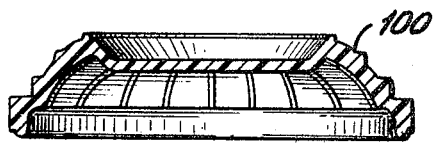
Figure 6:
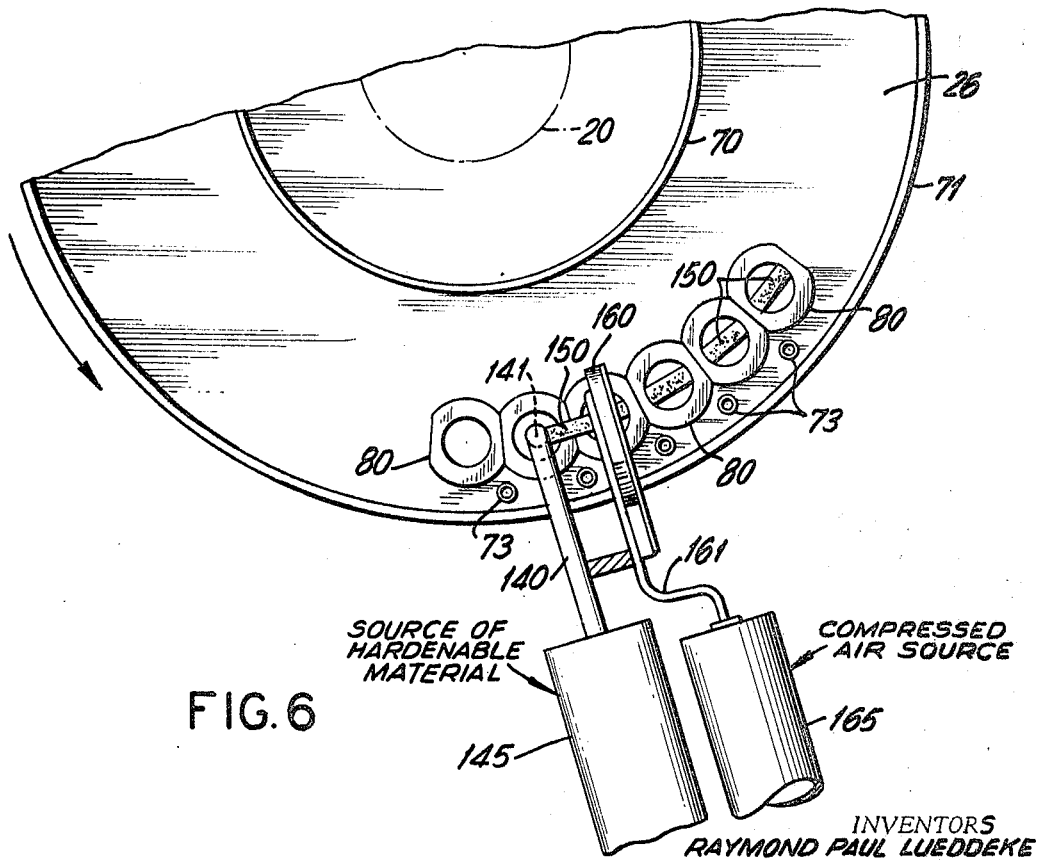
Figure 4:
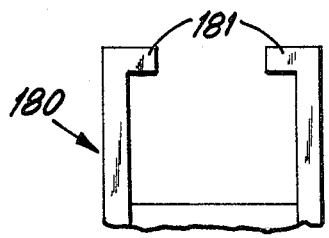
Figure 5:
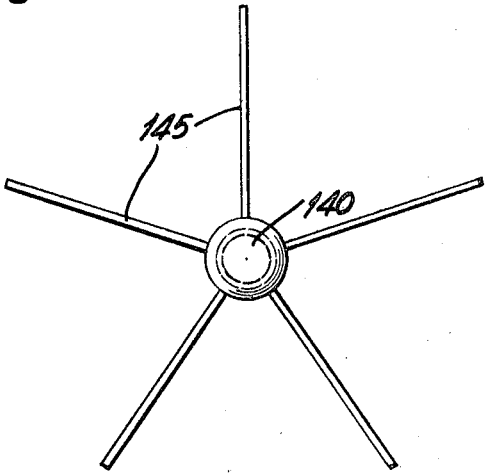
Figure 7:
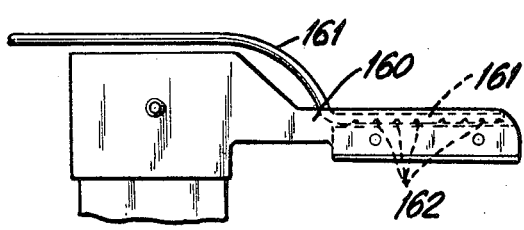
Figure 8:
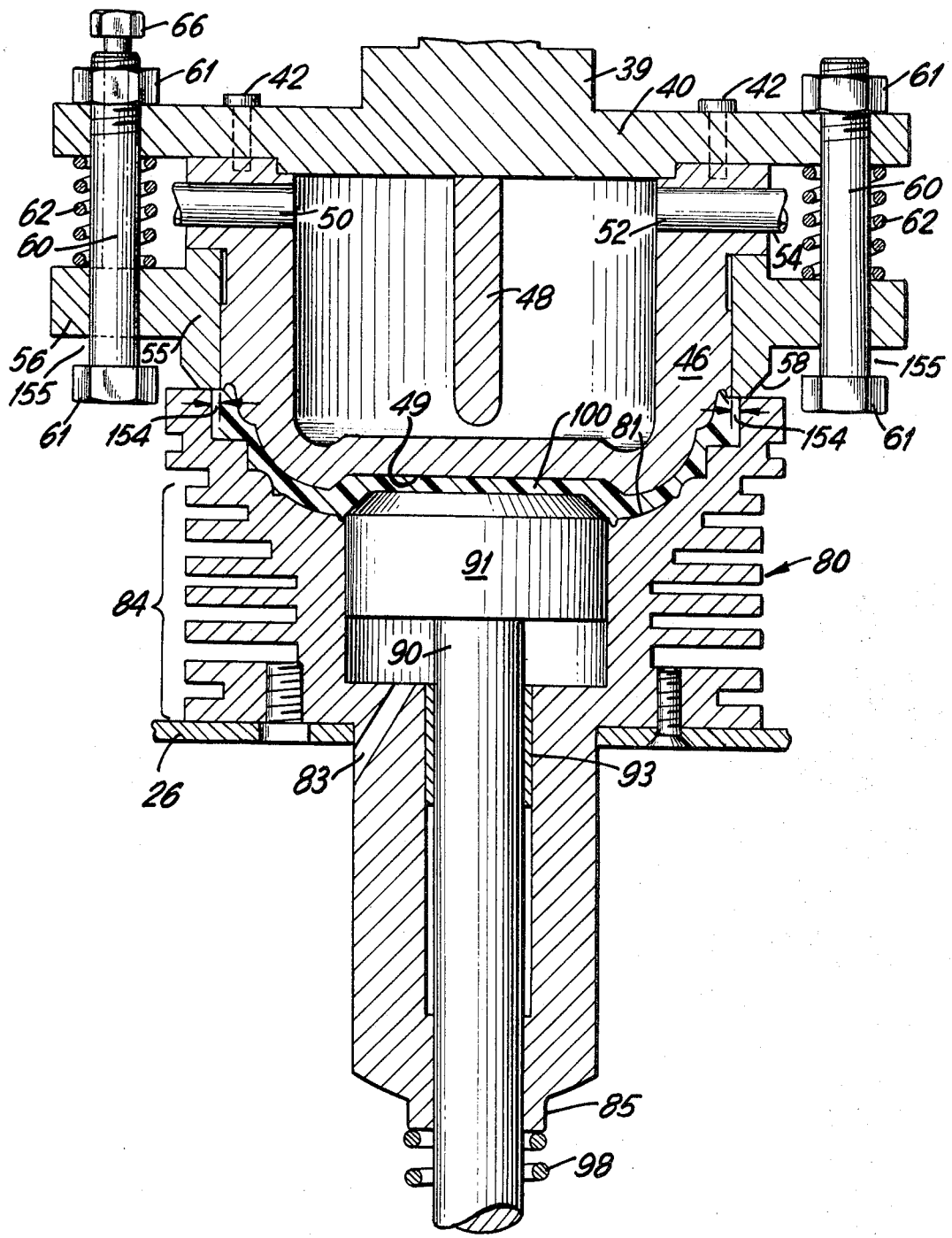

A complete understanding of the present invention and of the above and other features and advantages thereof may be gained from a consideration of an illustrative embodiment thereof present hereinbelow in conjunction with the accompanying drawings in which:

FIG. 1 is a partial cross sectional diagram of an illustrative target disc manufacturing machine organization which embodies the principles of the present invention;

FIGS. 2A and 2B respectively comprises top and cross sectional views of a target disc 100 manufactured by the machine organization of FIG. 1;

FIGS. 3A through 3D are diagrams depicting in linear form the configuration characterizing four cam embodiments included in the machine organization of FIG. 1;

FIG. 4 comprises a cross sectional diagram of a position retracting cam 180 utilized in the instant machine organization;

FIG. 5 illustrates a top view of a star wheel assembly utilized in the FIG. 1 machine;

FIG. 6 comprises a partial top view of female die and fill assemblies employed in the instant machine organization;

FIG. 7 depicts a side view of a doctor blade assembly employed in the present invention; and FIG. 8 comprises a cross sectional diagram illustrating the spatial relationship characterizing engaged male and female die elements in the operation of the FIG. 1 machine organization.

Referring now to FIG. 1, there is shown in partial cross sectional form a machine organization for fabricating clay target pigeons also known as "birds." More specifically, FIG. 1 is adapted to illustrate selected basic machine components and the structure associated with a particular mating pair of die assemblies which are shown as residing in an open or nonengaged status. It will be appreciated that the die elements shown therein are illustrative of a plurality of such organizations included in a composite plural manufacturing station machine embodying the principals of the present invention.

The machine organization includes a central shaft 20 which is rotated at a constant speed by a bull gear driving mechanism 21. Affixed to the shaft 20 and rotated thereby are a circular male mold mounting plate 23 and a circular female mold mounting plate 26. Supported on the upper machine plate 23 is a chamber 28 which contains a water coolant supplied thereto through a fill aperture 29. The chamber 28 has a plurality of taps 30 therein to supply coolant to the various bird manufacturing assemblies via an associated plurality of hose elements 53.

Included around the circumference of the upper machine plate 23 at each disc manufacturing position is male die housing member 33 which provides for the vertical sliding translation therethrough of a male die compression arm 36 having a bushing 35 therearound and the upper neck portion 39 of a male die head 40. A main press compression spring 37 is employed to bias the members 36 and 39 as shown.

Connected to the die head 40 by two screws is a principal annular male die member 46 having coolant entering and exiting apertures 50 and 52 therein. In addition, the die 46 includes a central vertical member 48 in the hollow interior thereof to force coolant to flow against the back of an operative die face 49 in its translation from the passage 50 to the exitway 52. The die or mold face 49 of the die 46, which is chrome plated for durability is adapted to conform to the underside geometry of the desired end product target disc 100 which are respectively shown in top and cross sectional view in FIGS. 2A and 2B.

Mounted circumferentially about a surface 47 on the male die 46 is a stripper ring 55 which has a flange portion 56. The ring 55 is connected to a flange on the male die upper head 40 by two symmetrically disposed bolts 60, having end fasteners 61 thereon, with compression springs 62 being disposed about the bolts 60 between the members 40 and 55. Further, a stud 66 is included in the stripper ring flange 56 to contact the machine plate 23 and act as a stop when the composite male die organization tends to rise above its normal operating range.

As indicated in FIG. 1, when the male die organization resides in a raised, open orientation, there is a clearance 59, illustratively on the order of one ⅜ quarter inch, between the top of the stripper ring 55 and a circumferential expanded projection on the male die 46 caused by the expanded springs 62 biasing the ring 55 downward. In addition, the stripper ring 55 includes a plurality of pressure relieving apertures therethrough in a beveled lower ring portion 58, which lower portion is also chrome plated for prolonged use. These apertuers are included on the leading edge of the ring 55 and, assuming counterclockwise rotation of the shaft 20, the apertures are located in the face of the ring 55 above the plane of the drawing. Accordingly, the apertures are not illustrated in the cross sectional depiction of FIG. 1.

Included around the periphery of the lower machine plate 26 at each manufacturing position is a female die 80 which includes a pressure relieving aperture 83, a chrome plated mold face 81, an elongated neck portion 95, and a plurality of cooling fins 84. Two concentric vertical annular members 70 and 71 are disposed on either side of the female molds 80 to form a water coolant containing chamber, with liquid being adapted to free fall from a nozzle 54 attached to the exit aperture 52 of each male die 46 into the inner portion of the female die coolant chamber adjacent to the chamber wall 70. A drain pipe 73 is employed between each die 80 and the outer chamber element 71 is to remove the coolant fluid to waste, or to a recirculation system.

An eject cylinder, or rod 90 having a bushing 93 therearound selectively vertically translates through the center of each female die 80. The rod 90 terminates at its upper end in a cylindrical rod head 91 which functions to form part of the composite female mold face when in a lowered position, and is further operative to raise a finished bird 100 at an appropriate point in an operational cycle for removal from the FIG. 1 organization. An annular hard rubber or metal disc 94 is affixed to the rod 90 and biased downwards by a compression spring 98 away from the die neck portion 85. Finally, a metal cam engaging cap 96 is affixed to the lower end of the rod 90.

The machine organization of FIG. 1 includes pressure, pick-up, and eject cam embodiments 110, 120 and 130 which are affixed to a machine frame which is stationary with respect to the above-identified rotating elements. A ball bearing 24 is affixed to the male die compression arm 36 by a bolt 25 and bears against the pressure cam 110. The cam surface 110 is employed to selectively force the male die 46 downward into the female mold 80 by exerting a downward force thereon which is coupled to the member 46 by the arm 36, the main pressure spring 37, and the male die head 40. The pick-up cam 120 is adapted to engage a second ball bearing 22 which is also mounted on the shaft 25 affixed to the pressure arm 36, and functions to raise the die 46 after a clay pigeon 100 has been formed by mating die faces 49 and 81.

The eject cam 130 acts against the metal cap 96 affixed to the eject rod 90, and is adapted to raise a finished bird 100 for removal at the end of a target fabricating revolution of the composite machine organization. The function of the aperture 83 in each female die 80 is to inhibit any sticking or slowing of the rod 90 and head 91 caused by piston-like air compression when the rod 90 translates through the die 80. Also, the aperture 83 serves as an exitway for any extraneous materials which find their way into the mold face 81 during the manufacturing process.

The beginning of a clay pigeon target 100 manufacturing cycle comprises injecting a stream of a molten, cold-hardenable tar composition into the female dies 80. Treating the fill point as 0° and 360°, the relative vertical attitudes of the pressure, pick-up and eject cams 110, 120, 130 are respectively shown in FIGS. 3A, 3B, 3C.

Figure 3A:
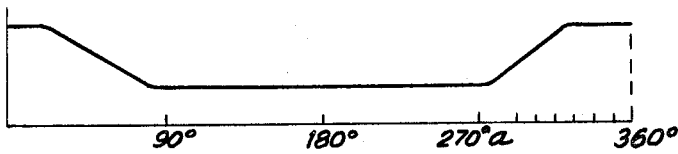
Figure 3B:
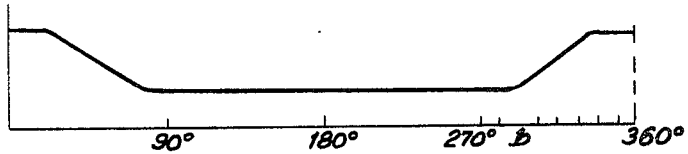

Examining FIGS. 3A and 3B, it is observed that the relatively high orientation of the cams 110 and 120 initially constrains each male die 46 to reside in a raised position while the operand tar composition is inserted in the associated female die 80. The male member 46 is subsequently lowered to compress the tar to form the desired bird form 100 between the mold faces 49 and 81, and retained in this position through the major portion of the composite cycle (360 operative degrees) while the target disc 100 cools and hardens.

The pressure cam 100 begins to rise at an operational angle $a$ (FIG. 3A), thereby relieving the disc forming pressure, and subsequently the male die 46 is raised beginning at an angle $b$ (FIG. 3B) under the action of the pick-up cam 120. Shortly thereafter, i.e., at the angle $c$ shown in FIG. 3C, the cam 130 forces the rod 90, and thereby also the now formed bird 100 upwards so that it may be removed. Between the angles $e$ and $g$ of FIG. 3C, the rod 90 returns by force of gravity, and also the additional urging of the spring 98, to its initial state such that the female die 80 may receive a new quantum of tar material to begin the bird manufacturing process anew.

Figure 3C:
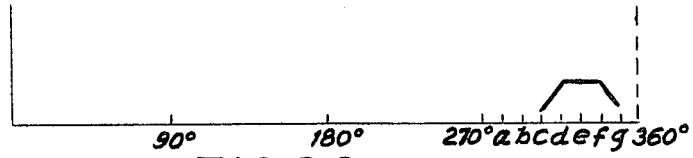
Figure 3D:
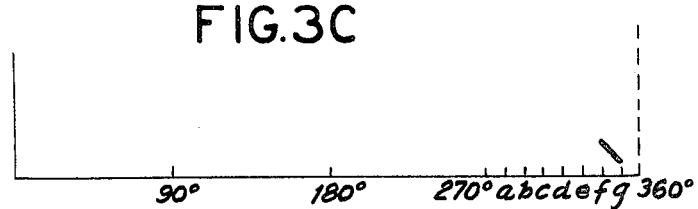

In order to insure positive resetting of the rod 90 following removal of a target 100, a retract cam 180, having a surface configuration illustrated in FIG. 3D and a cross section depicted in FIG. 4, is employed. The cam 180 includes two horizontal fingers 181 which engage the upper surface of the annular ring 94 on the rod 90, thus forcing the rod and ring to a downward status if such a rod state has not already been effected by gravity and/or the compression spring 98. It is noted that the cam 180 may be advantageously mounted directly on top of the cam 130.

For purposes of automatically removing a finished target bird 100 from an elevated rod head 91, a star wheel, having a shaft 140 and a plurality of equally spaced vanes 145 is driven in synchronization with the main machine drive shaft 20. System timing is arranged so that a horizontal vane 145 rotates past each elevated rod head 91, thereby sweeping the finished discs 100 onto an adjacent conveyor belt (not shown in the drawing for purposes of clairity). A top view of the star wheel configuration is shown in FIG. 5.

Turning now to FIG. 6, there is shown a partial vertical view of the bottom machine plate 26 having mounted thereon a plurality of female dies 80 having contiguous edges which lie along radii of the plate 26. Disposed above the center of the rotating (assumed counter-clockwise) dies 80 is a bottom aperture 141 of a spout 140 which deposits a continuous stream of operand tar material 150 from a source 145 thereof into and on the edges of the dies 80.

Advanced counter-clockwise from the nozzle 140 is a doctor blade 160 (shown in side view in FIG. 7) which is affixed at an angle, advantageously of 45°, to the rotating dies 80. The lower bottom of the edge of the canted blade 160 slides along the upper surface of the dies 80 thereby wiping the tar 150 off the upper edges of contiguous elements 80. In addition, a tube 161, having a plurality of apertures 162 at the end thereof, is affixed to the doctor blade 160 and is energized by a source of compressed hot air 165.

The forced air maintains the blade 160 at a temperature below that of the molten tar composition and also cools any tar material which comes near or in contact with the blade, thereby preventing any adhesion between the fill 150 and blade 160. Accordingly, all of the tar composition 150 is wiped off of the upper die 80 edges by the doctor blade 160 and is deposited by this element in the hollow of the next following female die 80. Hence, the fill organization of FIG. 6 is operative to deposit the proper amount of operand material, advantageously supplied in an easily regulated continuous stream in sequentially encountered female dies 80. Moreover, no spillage or waste is effected in the process.

The particular arrangement for forming a target pigeon 100, i.e., the configuration characterizing male and female dies 46 and 80 in an engaged position (under the action of the pressure cam 110 and the connecting elements 36, 37 and 40) is depicted in detail in FIG. 8. Note that the bird 100 is formed upside down, principally between the male die face 49 on the top, and the female die face 81 and the top of the eject rod head 91 on the bottom.

While in the engaged position, the springs 62 between the male die head 40 and the stripper ring flange 56 are compressed, such that the upper edge of the stripper ring 55 contacts the mating expanded portion of the die 46, hence eliminating the one ⅜ quarter inch gap 59 shown therebetween in FIG. 1. Correspondingly, the one ⅜ quarter inch space appears as a gap 155 between the lower edge of the stripper ring flange 56 and the lower fasteners 61 on the bolts 62. Also, it is observed that there is a torroidal ring adjacent to the outer, upper circumference of the formed bird 100 indicated by a width 154 in FIG. 8, wherein the bottom of the stripper ring 55 forms the operative upper die face.

Consequently, when pressure is removed from the male die 46 and this member is raised by the vertically rising pick-up cam 120 following the operational angle $b$ (FIG. 3B), the male die face 49 separates from the bird 100 while the operand disc 100 is firmly retained in the female die face 81 by the stripper ring 55 acting against the circumference thereof under the force of the compressed springs 62. After the upper head 40 affixed to the male die 46 has been raised by one ⅜ quarter inch, the bolts and lower bolt fasteners 60 and 61 lift the stripper ring 55 with the composite male die assembly hence freeing the bird 100 for later extraction from the female die 80 by the head 91 of the rod 90 acting in conjunction with the cam 130 and the star wheel organization.

Thus, it is noted that the stripper ring 55 assures that the bird 100 will not improperly adhere to the male die face 49 when it is raised, and that operand member 100 will not be prematurely extracted from the female die 80.

In addition, it was noted hereinabove that the leading edge of the stripper rings 55 had a plurality of apertures in the leading edge of the lower beveled portion 58 thereof. These apertures become unblocked after the male die 46 is initially raised in a very small amount, and thence serve to obviate any piston type vacuum which might tend to inhibit translation of the male die assembly or to cause the bird 100 to move therewith. The male die 46 is thus allowed to rise in a rapid and smooth manner.

With the above structural and functional aspects in mind, a description of the manner in which the various machine subassemblies cooperate to form a target disc 100 will now be revised and further considered. A molten tar composition 150 is continuously supplied to the female dies 80 rotating therepast on the lower machine plate 26. The composition 150 is wiped from the tops of the dies 80 and is inserted therein by the bottom edge of an inclined doctor blade 160 acting in conjunction with relatively hot air supplied by apertures 162 in an air tube 161.

Shortly past the fill point, each male die 46, together with the concentric stripper ring 55, is forced against the mold face 81 of an associated tar containing female die 80 by the pressure cam 110 acting through the pressure arm 36, the main press spring 37 and the upper die head 40. The dies 46 and 80 remain engaged while the traget bird 100 is being cooled, and thereby hardened by the water coolant. More specifically, the coolant eminates from the chamber 28 via the spout 30, and flows through the hose 53 and the input aperture 50 into the hollow of the male die 46, thereby cooling this member and retaining it at a low temperature relative to the molten tar to partially cool the operand composition. The fluid exits from the die 46 via the output aperture 52 and nozzle 54 and falls into a chamber around the female die 80 defined by the concentric wall elements 70 and 71.

The female die 80 is then operative to pass heat from the cooling bird 100 to the water flowing therearound by way of the cooling fins 84 included on the die 80. The water exits the outside periphery of the lower machine plate 26 by way of a plurality of water drains 73.

It is noted that the water coolant enters the lower cooling chamber near the inner chamber wall 70, and exits adjacent to the outer member 71. Thus, the centrifugal force of the rotating machine plate 26 forces the relatively cool water past the female die 80 cooling fins 84 where heat exchange occurs, with the heated water then being returned to a liquid sink. This has been found to comprise a significant improvement over organizations where water is removed from the inner lower chamber portion since, in such arrangements, heated water is trapped by centrifugal force around its outside chamber element 71 thus providing a hot bath rather than cooling for the outer portions of the female dies 80.

After a target disc 100 is hardened, pressure is relieved from the male die 46 at the rotational angle $a$ (FIG. 3A) and the die 46 then begins to rise under the action of the pick-up cam 120 at the angle $b$ (FIG. 3B). As the male die face 49 separates from the bird 100, the operand disc 100 is held firmly in place by the stripper ring 55 acting on the periphery thereof. After a small vertical translation, the stripper ring 55 rises with the male die 46 thus freeing the bird 100.

At the angle $c$ (FIG. 3C), the eject cam 130 forces the rod 90 upwards, whereupon the finished target disc 100 is raised for removal by the rod head 91. A vane 145 on the star wheel which is synchronized with the main machine drive is then adapted to sweep the finished bird 100 onto a conveyor belt.

Following this, i.e., flowing the angle $e$ in FIG. 3C, the rod 90 and the rod head 91 are forced downward by the spring 98 acting against the rod disc 94 and also under the force of gravity. If any sticking results, the fingers 181 on the positive retract cam 140 engage the upper surface of the disc 94 mounted on the rod 90 thereby forcing these elements down. In this regard, the aperture 83 in the female die 80 alleviates any motion-retarding piston forces.

The composite organization is thus returned to its initial state, and begins the above described manufacturing sequence anew to form another target bird 100.

It is to be understood that the above-described arrangement is only illustrative of the application of the principals of the present invention. Numerous other arrangements may be devised by those skilled in the art without departing from the spirit and scope of this invention.

What is claimed is:

1. In combination in a traget disc manufacturing machine organization, a plurality of contiguous female dies mounted for rotation in a given direction, means for supplying a continuous stream of molten hardenable material to said female dies disposed above said female dies, inclined doctor blade means offset from said material supplying means in said given direction, means for mounting said doctor blade means in a sliding contact relationship with said female dies, said doctor blade means comprising an inclined blade having a lower edge in sliding contact with said female dies, and forced air supply means mounted in a fixed relationship with said blade for cooling said blade and preventing said hardenable material from adhering to said doctor blade.

2. A combination as in claim 1 further comprising a plurality of eject rods each mounted for vertical translation through a chamber included in a different one of said female dies, and a pressure relieving aperture included in the chamber in each of said female dies for permitting free translation of said eject rod through said chamber.

3. A combination as in claim 2 further comprising a plurality of retracting discs each mounted on a different one of said eject rods, and retract cam means for selectively engaging said discs for urging said rods down through said female dies.

4. A combination as in claim 3 further comprising means for rotating said female dies, and star wheel means synchronized with said rotating means for periodically passing over said eject rods when said rods reside in an elevated state.

5. In combination in a target disc manufacturing machine organization, at least one male and at least one female die, a stripper ring including a plurality of pressure relieving apertures for permitting free translation of said male die relative to said stripper ring disposed about each male die, spring biasing means connecting each said male die and stripper ring, and cam means for selectively urging each said male and female die into a pressure contact and for disengaging said elements, said apertures dissipating any vacuum otherwise formed when said male die moves past said stripper ring under urging of said spring biasing means.

6. A combination as in claim 5 wherein each female die includes a die face which mates with associated die faces included on an associated stripper ring and male die.

7. A combination as in claim 6 further comprising an eject rod included in each female die, and wherein each female die includes a pressure relieving apperture therein.

8. A combination as in claim 7 further comprising eject cam means in bearing contact with each eject rod.

9. A combination as in claim 8 further comprising a retracting disc mounted on each eject rod, and retract cam means including finger means for selectively engaging each retracting disc.

10. A combination as in claim 10 further comprising means for rotating said male and female dies, means for supplying a coolant fluid to one side of each male die for circulation therethrough, a fluid chamber surrounding each female die, means for extracting said fluid from the opposite side of each male die and for translating said fluid to the portion of said fluid chamber nearest the axis of rotation of each female die, and means for extracting said fluid from the portion of said fluid chamber most removed from the axis of rotation of each female die.

11. A combination as in claim 10 further comprising star wheel means synchronized with said female die rotating means for periodically passing over the upper periphery of each eject rod.

12. A combination as in claim 11 further comprising fill means for supplying a molten, hardenable material to each female die, and inclined doctor blade means offset from said fill means for sliding over the upper surface of each female die.

13. A combination as in claim 12 further comprising means for supplying forced air mounted in a fixed relationship with said doctor blade means.

References Cited

UNITED STATES PATENTS

| | | | |
|---|---|---|---|
| 495,228 | 4/1893 | Parker | 18—20 |
| 1,896,870 | 2/1933 | Smith | 65—184 |
| 2,573,365 | 10/1951 | Scholes et al. | 65—184 |
| 3,159,011 | 12/1964 | Kaluzny et al. | 25—99 |

WILBUR L. McBAY, *Primary Examiner.*

U.S. Cl. X.R.

18—4, 20; 25—22; 65—177, 184